April 29, 1952 H. R. DAVIS 2,594,880
PURIFICATION OF OILS BY CLAY CONTACTING
Filed Nov. 1, 1949
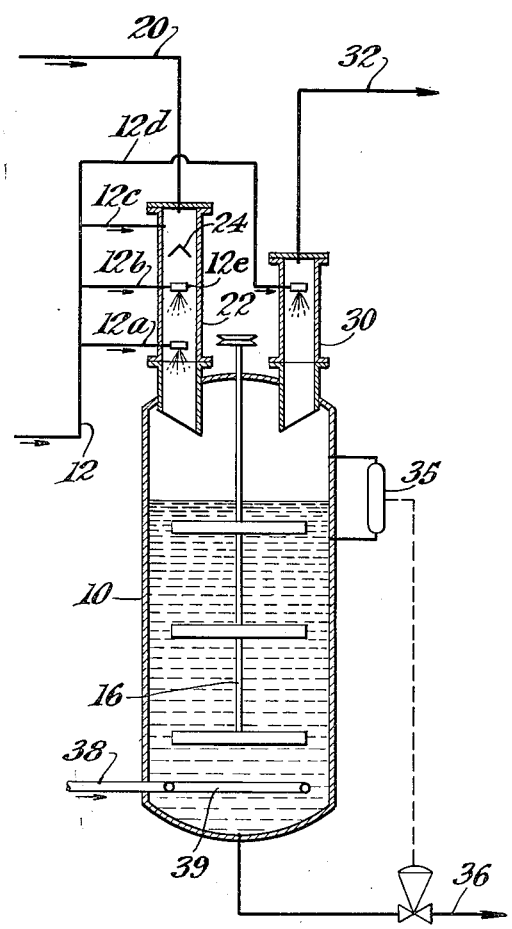
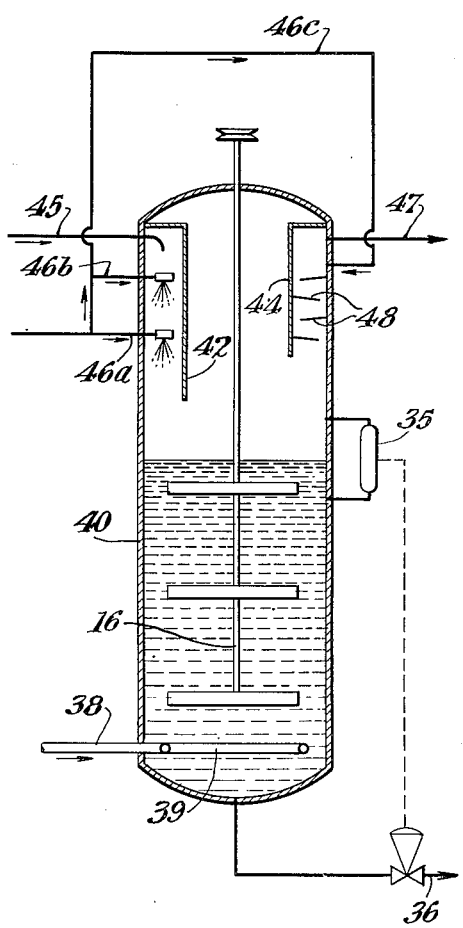
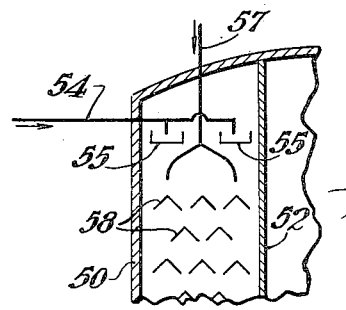
INVENTOR.
Hyman R. Davis
BY Nathaniel Ely
ATTORNEY Patented Apr. 29, 1952

2,594,880

UNITED STATES PATENT OFFICE 2,594,880

PURIFICATION OF OILS BY CLAY CONTACTING

Hyman R. Davis, Jackson Heights, N. Y., assignor to The Lummus Company, New York, N. Y., a corporation of Delaware Application November 1, 1949, Serial No. 124,929

8 Claims. (Cl. 210—42.5)

This invention relates to improvements in contact processes such as clay contacting of fatty acids, waxes, lubricating oils, or similar materials for removing color bodies or other contaminants.

In such processes, measured quantities of clay or other refining agent are mixed with the material to be treated in a suitable tank and the mixture may be agitated and heated for a predetermined period of time. By utilizing suitable refining agents it has been found that particular impurities such as color bodies are removed with the agents and the purified liquid could then be further treated and finished for marketing.

In the past, the handling of clay as a specific refining agent has very frequently introduced mechanical complications which have made the contacting operation very expensive. The clay is abrasive and hygroscopic. It tends to pack, and is difficult to transport, meter, or weigh. To avoid some of these difficulties the clay is usually mixed prior to contacting with the main body of the liquid to be treated with a small amount of liquid to form a slurry, which is then pumped to the contact apparatus. Usually it is also pumped away from the contact tank by slurry pumps which have proved to be expensive items to make and much more expensive pieces of apparatus to maintain. Precise measurement of the clay by other means has not been more satisfactory.

According to my invention the handling of pulverized refining agents used in contact plants for decolorizing or removing of objectionable impurities from various types of liquids such as animal, mineral, or vegetable oils, waxes, etc. is greatly simplified. This invention also makes it possible to simply a clay contact plant for the purification of lubricating oil whereby pumps for the clay can be eliminated so that the initial plant cost and the upkeep can be substantially reduced.

Furthermore the control of flow of a granular and normally adsorptive contact material such as clay may also be simplified. This is important in the feed system to the contact tank, where the refining agent is to be used for decolorizing under conditions of temperature and pressure. A precise control of flow of materials is essential to obtain economical operation of this process. When clay and oil are brought together as hereinafter described, there will be a high efficiency of wetting, contact, and heat transfer. Any water contained in the clay will be liberated as steam. Due to the particular characteristics of the system, there will be no foaming.

Objects and advantages of the invention will appear from the following description of a preferred form of embodiment thereof taken in connection with the attached drawing which is illustrative thereof, in which:

Fig. 1 is a schematic view of a contact tank for a clay contacting plant.

Fig. 2 is a view similar to Fig. 1 of a modified form of apparatus.

Fig. 3 is an enlarged detail of the upper part of a modified form of contact tank.

With particular reference to the attached drawing, the plant is primarily adapted to treat lubricating oil at an intermediate stage in its production primarily for the purpose of decolorizing. The principal element in such an operation is the contact or time tank 10 to which the oil is directly charged through the line 12. The tank 10 is provided with a suitable mixer generally indicated at 16 which may be horizontal or vertical, as desired.

Introduction of the clay in dry form to the contact tank is preferable but heretofore has been impossible because of the difficulties of transporting it. This is due largely to its highly abrasive properties and its tendency to pack. Ordinarily a slurry has been prepared using a part of the oil which was to be contacted. However, this requires special pumps and other equipment.

Preferably the clay which is normally available in a bulk hopper or storage bin is removed by the application of an inert gas, for example, as described in copending application Serial No. 58,326, filed November 4, 1948, of which I am a coinventor. The clay is then carried through line 20 to the clay inlet header 22 on the contact tank 10. The fluidized clay, is constantly and uniformly discharged into the header. The clay is very finely divided at this point and presents a very large contact area. Upon entering the header it flows downwardly over the baffle 24 which causes an equal distribution of clay over the entire cross-section of the header 22.

The charge oil is simultaneously fed from a suitable charge oil reservoir not shown at a preferred temperature of 300 to 650° F. and it may be introduced at one or more of the various levels in header 22 as by lines 12a, 12b, and 12c. The lower lines 12a and 12b, may have spray nozzles or other distributors 12e on the ends.

As the fluidized clay flows downward in header 22 it is thoroughly wetted and contacted with part of the oil as it enters the header 22 through the oil line 12c, and then as the clay is interrupted in its flow by baffle 24 it is again wetted and contacted with oil at 12b and 12a. During this wetting and contacting operation, the hot oil will cause all the water in the clay to be volatilized and passed off as stem. Efficient heat and material transfer between the oil and fluidized clay will result in a stream of gas substantially stripped of clay and a slurry of oil and clay. Since the wetting action is complete, there is no foaming. A very complete mixture, without mechanical mixing is thus obtained before the clay meets the main body of oil in the lower part of the contact tank 10. In such case as little as 3 lbs. of clay per barrel of oil may be used for clarification and usually not more than 25 lbs. per barrel are needed.

Vertical baffles may be installed in tank 10, if desired, to direct the flow of gas. However, the velocity of gas in headers 22 and 30 is low and there is accordingly little tendency for oil or clay to be carried over to the header 30. Since the area of header 22 will generally be smaller than the free area above the liquid surface of the tank 10, the gas velocity will be lower in the tank. This will permit the oil-clay slurry to drop out of the gas stream with a minimum of entrainment.

The clay contact tank 10 may be provided with a vapor scrubber chamber 30 similar in form to header 22, such scrubber chamber having a vacuum draw off line 32. If some of the feed oil is introduced as at 12d by a sparger into this vapor dome, it serves to scrub the vapors of any entrained clay.

The mixing level within tank 10 is maintained by suitable level control 35 interconnected to draw off line 36 in a well known manner. Line 36 leads to the filters, not shown. Supplementary steam may also be introduced through line 38 and sparger 39 to aid agitation and drive off volatiles from the clay mixture.

In Fig. 2, the contact tank 40 is similar to the first form shown in Fig. 1 except that the inlet chamber and the scrubber chamber are integrally built within the contact tank 40 by the use of baffles 42 and 44. In the contact chamber formed by baffle 42, the clay is introduced in measured quantities through line 45 and the oil is introduced through lines 46a and 46b. A part of the oil may also be used for scrubbing outlet vapors in the scrubber chamber by feeding it into the enclosed area of baffle 44 through line 46c. The vapors are removed in this case by line 47. Transverse inwardly and downwardly sloping decks 48 in the scrubber chamber tend to disentrain solids from the vapors, the solids being carried away by the oil.

In Fig. 3, the contact tank is indicated at 50 and has an internal transverse baffle 52 forming a preliminary contacting chamber. In this construction the oil enters through pipe 54 and overflows cup baffles 55 thereby being distributed generally across the chamber. Clay enters by pipe 57, being distributed by angle irons 58 in relatively thin continuous layers. The oil completely coats the clay so that an intimate mix is present by the time the mixture reaches the main mass below.

The modification of the contact tank to accomplish preliminary mixing has proved to greatly simplify operations and not only eliminates external mixing tanks, slurry pumps, etc. but materially reduces the amount of clay used for any particular decolorizing or treating operation.

While I have shown and described a preferred form of embodiment of the invention, we are aware that modifications may be made thereto and I therefore desire a broad interpretation of the invention within the scope and spirit of the description herein and of the claims appended hereinafter.

I claim:

1. The method of contacting oil with a clay refining agent which comprises fluidizing said clay with an inert gas, passing said fluidized clay at a temperature below the boiling point of water into a chamber, injecting oil at a temperature in the range of 300° F. to 650° F. into said chamber thereby wetting said clay thoroughly with said oil and liberating the moisture therefrom, withdrawing from said chamber said inert gas and moisture vapor substantially free of clay, and a mixture of said oil and clay, passing said mixture of oil and clay to a contact zone, retaining said mixture in said zone for a sufficient time to contact said oil with said clay and to liberate light gases formed during said contacting, withdrawing from said zone said liberated gases and said inert gas, and separately withdrawing said clay and contacted oil from said zone.

2. The method of contacting oil with a clay refining agent claimed in claim 1 wherein the mixture of oil and clay in said contact tank is agitated and supplementary steam is introduced at a lower point in said tank.

3. The method of contacting an oil with a clay refining agent which comprises fluidizing said clay with an inert gas, passing said fluidized clay at a temperature below the boiling point of water through an attenuated course, injecting a coarse stream of hot oil into said stream of fluidized clay, directing said hot oil and said fluidized clay onto a distributing means whereby said stream of hot oil and fluidized clay are evenly distributed in said attenuated course, injecting at least one finely divided stream of hot oil into said stream of hot oil and fluidized clay, thereby wetting said clay thoroughly with said hot oil, and simultaneously disengaging as steam the water contained in said clay, withdrawing from the end of said course said disengaged steam and said inert gas substantially free of clay, and a mixture of said oil and said clay, passing said mixture of oil and clay to a contact tank, retaining said mixture in said tank for a sufficient time to contact said oil with said clay and to liberate light gases formed during said contacting, withdrawing from said tank said contacted oil and said clay, passing said disengaged steam and said inert gas substantially free of clay to an upper part of said tank wherein the cross-section area of said gas passage is greater than the cross-section area of said gas passage in said attenuated course whereby the gas will have a very low velocity through the upper part of said tank thereby enabling any entrained clay to separate therefrom, combining said disengaged steam and inert gas with said liberated gases, passing said combined gases to an outlet chamber, and scrubbing said combined gas with fresh oil feed thereby removing all of said clay from said gases.

4. The method of contacting an oil with a clay refining agent which comprises fluidizing said clay with an inert gas, said clay containing water, passing said fluidized clay into a chamber, injecting a stream of hot oil into said stream of fluidized clay, directing said stream of hot oil and said fluidized clay into a distributing means whereby said stream of hot oil and fluidized clay are evenly distributed in said chamber, injecting at least one finely divided stream of hot oil into said stream of hot oil and fluidized clay, thereby wetting said clay thoroughly with said hot oil and simultaneously disengaging as steam the water contained in said clay, withdrawing from said chamber said steam and said inert gas substantially free of clay, and a mixture of said oil and said clay, passing said mixture of oil and clay to a contact tank, retaining said mixture in said tank for a sufficient time to contact said oil with said clay and to liberate light gases formed during said contacting, injecting steam into the bottom of said tank, agitating said mixture, maintaining a substantially constant liquid level in said tank, withdrawing from said tank said contacted oil and said clay, passing said disengaged steam and said inert gas substantially free of clay to an upper part of said tank wherein the cross-section area of said gas passage is greater than the cross-section area of said gas passage in said chamber, whereby the gas will have a very low velocity through the upper part of said tank thereby enabling any entrained clay to separate therefrom, combining said disengaged steam, said inert gas, said liberated light gases, and said injected steam to form a single gas phase in the upper part of said tank, passing said gas phase to an outlet chamber, scrubbing said gas phase with fresh oil feed thereby removing all of said clay from said gas phase, withdrawing said clay-free gas phase from said outlet chamber and passing said fresh oil feed to said contact tank.

5. The process of clay refining an oil at superatmospheric temperatures in which the clay is in the ratio of about three pounds to about twenty five pounds per barrel of oil, such clay normally having a water content not to exceed about fifteen percent which comprises uniformly discharging the clay at temperatures below the boiling point of water and oil at substantially higher temperatures into an attenuated zone above a main refining chamber, said oil being injected into said attenuated zone in a coarse stream, the clay being discharged in a relatively coarse stream under the influence of a carrier gas into the attenuated zone above the initial oil sprays, interrupting the gravity flow of the clay into attenuated paths in the presence of the oil whereby the clay particles are intimately wetted with oil, passing said wetted clay particles into an oil reservoir in the main refining chamber, agitating said oil and clay therein, and removing, through an attenuated outlet zone adjacent the top of the refining chamber spaced from the attenuated clay inlet zone, the carrier gas and other released vapors.

6. The process of clay refining an oil as claimed in claim 5 in which the initial contact of oil with clay is by a very coarse spray of oil, and the subsequent contact of oil with clay is by a very fine oil spray.

7. The process as claimed in claim 6 in which a part of the charge oil is sprayed into the attenuated outlet zone to scrub clay particles that are gas borne therein.

8. An apparatus for contacting an oil with a fluidized-clay refining agent which comprises a contact tank, and internal transverse baffle at the upper part of said tank forming an inlet chamber of less cross section than the major cross section of said tank, fluidized-clay inlet means at the upper part of said inlet chamber, at least one fresh-oil inlet means at a lower point in said inlet chamber, said last mentioned means including a spray nozzle, agitating means in said tank, a second transverse baffle at the upper part of said contact tank and laterally spaced from the first mentioned baffle, said second transverse baffle forming a scrubber chamber, fresh-oil inlet means adjacent to the top of said scrubber chamber, vapor outlet means connected to the upper part of said scrubber chamber and liquid removal means at a lower part of said tank.

HYMAN R. DAVIS.

REFERENCES CITED

The following references are of record in the file of this patent:

UNITED STATES PATENTS

| Number | Name | Date |
|---|---|---|
| 1,930,597 | Osterstrom et al. | Oct. 17, 1933 |
| 2,033,057 | Watts et al. | Mar. 3, 1936 |
| 2,045,160 | Moorman et al. | June 23, 1936 |
| 2,458,162 | Hagerbaumer | Jan. 4, 1949 |
| 2,492,998 | Lassiat | Jan. 3, 1950 |